(No Model.)
C. P. HIGGINS.
MACHINE FOR FORMING AND PUNCHING POLYGONAL TUBES.
No. 336,853. Patented Feb. 23, 1886.
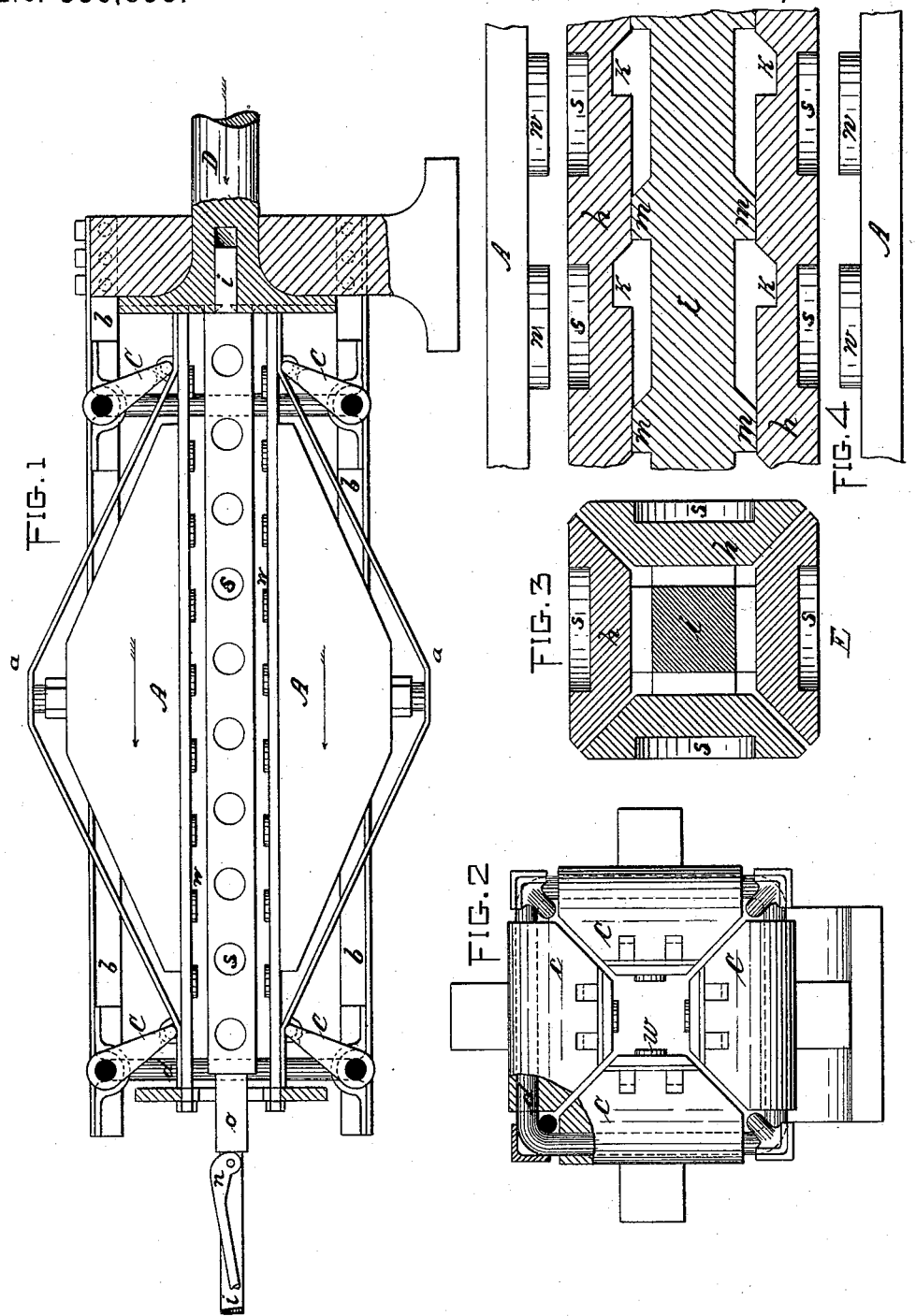

UNITED STATES PATENT OFFICE.

CAMPBELL P. HIGGINS, OF PHILADELPHIA, PENNSYLVANIA.

MACHINE FOR FORMING AND PUNCHING POLYGONAL TUBES.

SPECIFICATION forming part of Letters Patent No. 336,853, dated February 23, 1886.

Application filed October 10, 1885. Serial No. 179,493. (No model.)

*To all whom it may concern:*

Be it known that I, CAMPBELL P. HIGGINS, a citizen of the United States, residing at Philadelphia, Pennsylvania, have invented certain new and useful Improvements in Machines for Forming and Punching Polygonal Tubes, of which the following is a specification, reference being had to the accompanying drawings, forming a part thereof, in which—

Figure 1 is a side view, and Fig. 2 an end view, of a machine embodying my invention. Fig. 3 is a cross sectional view of the mandrel, and Fig. 4 a longitudinal section of the same and a pair of formers and punches.

Similar letters of reference indicate corresponding parts in the several figures.

In order that others may understand and use my invention, I will first proceed to describe a machine embodying the same, and subsequently point out its novel characteristics in the claims.

In the drawings, A represents four pressure-beams or formers, arranged in the present instance in opposite parts at right angles, and adapted to form, in conjunction with a suitable mandrel, a rectangular tube from a cylindrical blank. The formers A may be constructed in substantially the form shown in Fig. 1, and provided with trusses $a$ or other means to prevent springing under extraordinary pressure. Each former is suspended by toggles C, pivoted thereto and to the framework $b$ of the machine, the relative position of the toggles, when the formers are open, radiating from a center line drawn parallel with the formers between them, as shown in Fig. 1.

D represents a follower fitted in guideways and capable of a reciprocating movement by any suitably-applied power. The face of the follower D is connected with the four pressure-formers A, so that when moved forward in the direction indicated by the arrow it gives a corresponding longitudinal movement to the formers. The latter, being suspended to the toggles C are also moved radially, and thereby closed upon the mandrel. The outer ends of the toggles C are pivoted on the four sides of square rings $d$, as shown in Fig. 2, the rings $d$ being made round in cross-section, so that the toggles may swing thereon.

In the operation of squaring a cylindrical blank, a mandrel of the desired size is placed therein, and the two between the pressure-formers, so that by a forward movement of the follower D and resultant radial movement of the formers A the blank will be flattened on its four sides, a return movement of the follower causing the formers to open and relieve the pressure on the blank. The mandrel may now be removed and a sectional mandrel, E, substituted, as shown in section in Fig. 3. This mandrel E is composed of beveled parts $h$, arranged around a central core, $i$, and made capable of a longitudinal movement on said core. The sections or parts $h$ are constructed with recesses $k$ on their inner surfaces, and the core $i$ with corresponding projections, $m$, that mesh therein, each being formed with an inclined side, as shown in Fig. 4, so that by a longitudinal movement of the sections $h$ the projections $m$ may be disengaged.

For the purpose of effecting a longitudinal movement of the sections $h$, I pivot a cam-lever, $n$, upon the core $i$, as shown in Fig. 1, and introduce a sleeve, $o$, in contact with the working-face of the cam-lever, and also connect the sleeve with the sections or parts $h$ of the mandrel, so that by operating the cam-lever the recesses $k$ in the sections or parts $h$ are brought over the projections $m$ on the core $i$, which allows the sections $k$ to collapse, when the mandrel may be withdrawn from the blank.

For the purpose of punching holes in the flat sides of the blank, the sections or parts $h$ are provided with holes $s$ in their outer sides, to receive the punches $w$, arranged upon the faces of the formers A, as shown in the several figures.

Having thus fully described my invention, what I claim, and desire to secure by Letters Patent, is—

1. In a machine for forming polygonal tubes, the combination of a mandrel and a series of pressure beams or formers suspended upon vibrating arms or toggles pivoted to a suitable frame-work, with a connected power-follower for producing a longitudinal and resultant radial movement of said formers, for the purpose specified.

2. In a machine for forming and punching polygonal tubes, the combination of a sectional mandrel having a relaxing core and depressions upon the external faces of the respective sections thereof, with a series of pressure-beams suspended upon vibrating arms or toggles and provided with punches, and a power-follower for producing a longitudinal and resultant radial movement of said pressure-beams, for the purpose specified

CAMPBELL P. HIGGINS.

Witnesses:
CHAS. F. SIMMONS,
ALEXANDER RICKEY.